June 23, 1959  G. A. GAYLER  2,892,109
PERMANENT MAGNET ALTERNATORS
Filed Oct. 1, 1956  3 Sheets-Sheet 1

INVENTOR
GEORGE ALFRED GAYLER
BY
Paul M. Craig, Jr.
ATTORNEY

June 23, 1959  G. A. GAYLER  2,892,109
PERMANENT MAGNET ALTERNATORS
Filed Oct. 1, 1956  3 Sheets-Sheet 2
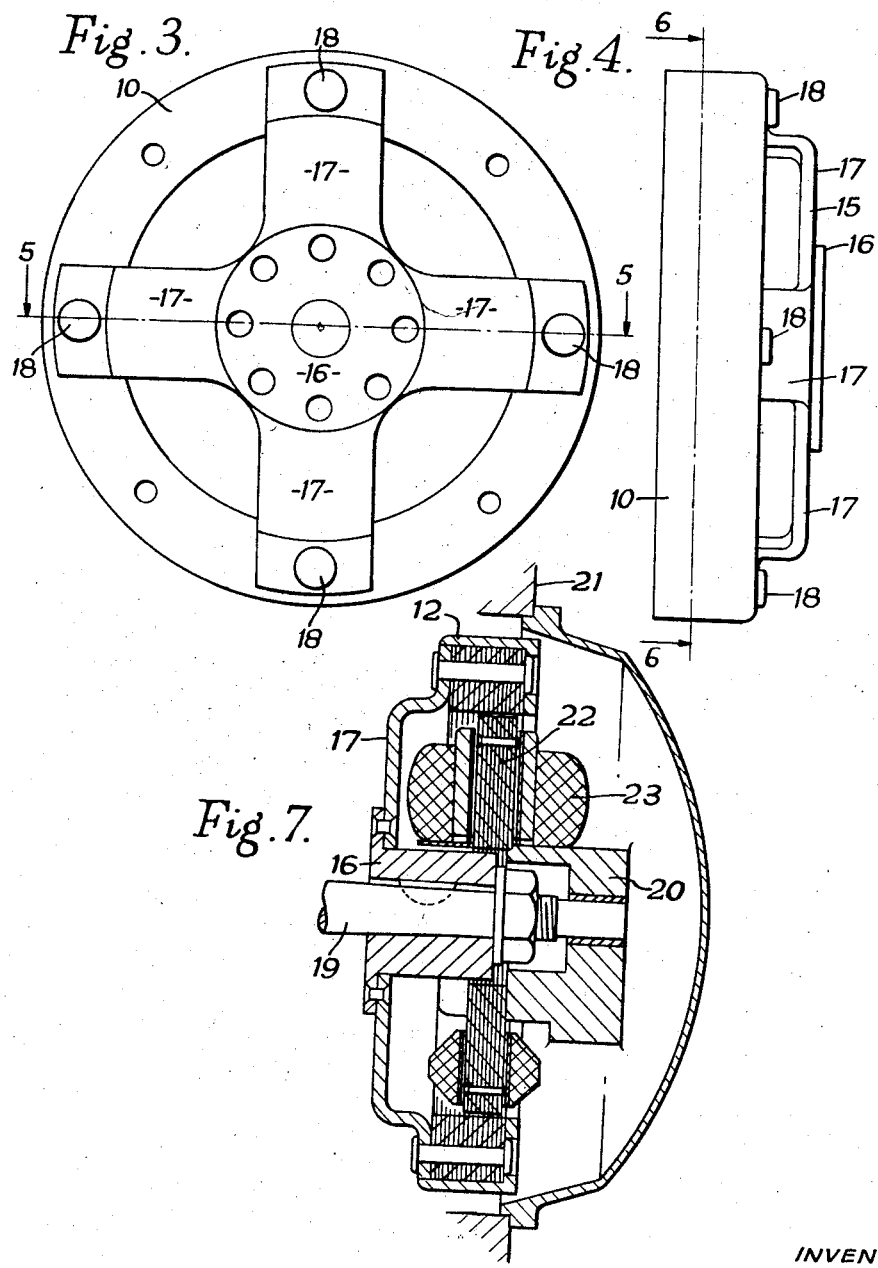
INVENTOR
GEORGE ALFRED GAYLER
BY
Paul M. Craig, Jr.
ATTORNEY June 23, 1959  G. A. GAYLER  2,892,109
PERMANENT MAGNET ALTERNATORS
Filed Oct. 1, 1956  3 Sheets-Sheet 3
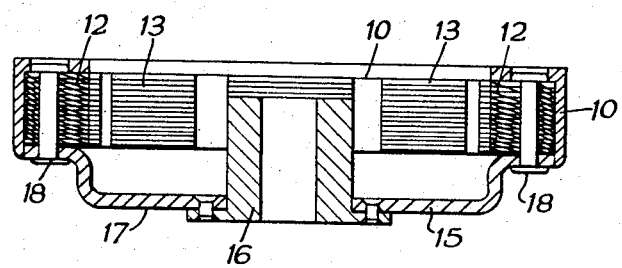
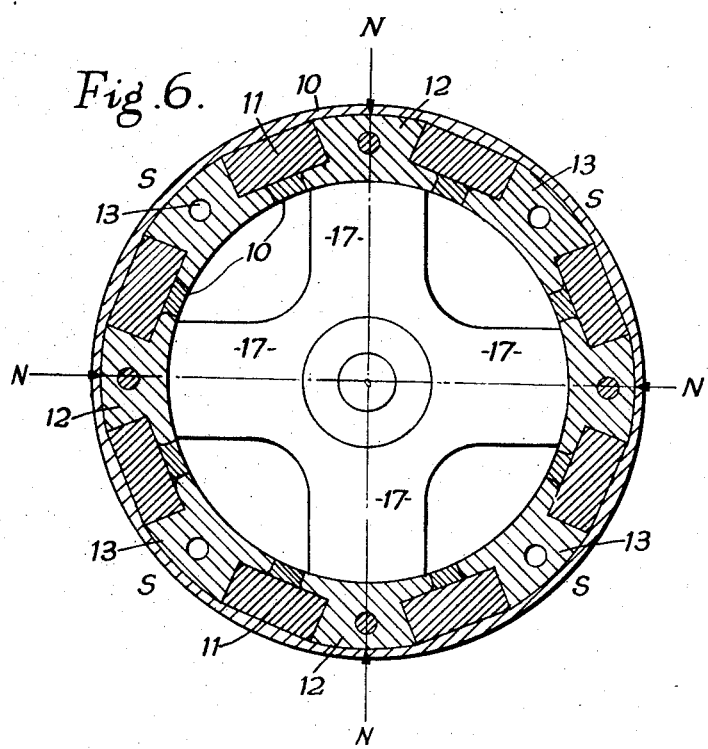
INVENTOR
GEORGE ALFRED GAYLER
BY
Paul M. Craig, Jr.
ATTORNEY United States Patent Office 2,892,109
Patented June 23, 1959

2,892,109

PERMANENT MAGNET ALTERNATORS

George Alfred Gayler, Bletchley, England, assignor to Wipac Development Limited, Bletchley, Buckinghamshire, England Application October 1, 1956, Serial No. 613,296

Claims priority, application Great Britain October 11, 1955

5 Claims. (Cl. 310—153)

The present invention relates to permanent magnet alternators of the type in which a flywheel carrying a plurality of permanent magnets and pole pieces is mounted for rotation relatively to a stator having one or more wound poles, the rotor being adapted when rotated, to generate flux reversals on the stator winding.

It has been the practice hitherto in alternators of this type to arrange the magnets and pole pieces in a rim portion of the flywheel and to connect this rim portion to a hub by means of non-magnetic material in order to avoid short-circuiting of the flux of the magnets. For adequate strength it has been necessary to make the flywheel thicker (perpendicular to the axis of rotation) than would otherwise be desirable.

The present invention has for its principal object to enable the thickness of the flywheel and its cost of manufacture to be reduced.

According to the present invention, in an alternator of the type specified, the flywheel comprises a rim portion connected to a hub by a plurality of uniformly spaced arms of steel, permanent magnets being disposed around the rim portion in number twice the number of the arms, and the arrangement being such that the magnets polarize the extremities of all the arms to the same polarity.

Figure 1:
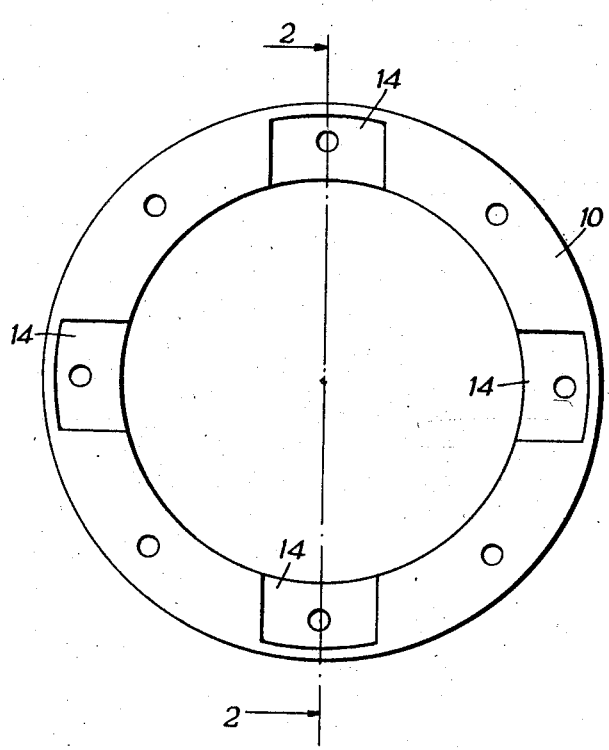
Figure 2:
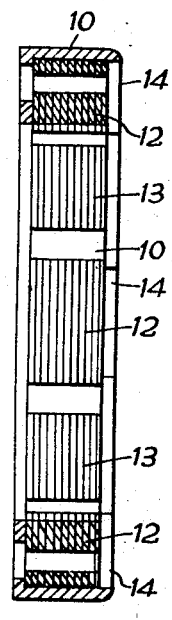

The invention will be described by way of example with reference to the accompanying drawings, in which:

Fig. 1 is a view in front elevation of the rim portion of a flywheel in one embodiment according to the invention, Fig. 2 is a view in section on the line 2—2 of Fig. 1, Fig. 3 is a view in front elevation of the complete flywheel of this embodiment, Fig. 4 is a view of the flywheel of Fig. 3 in side elevation, Fig. 5 is a view in section on the line 5—5 of Fig. 3, Fig. 6 is a view in section on the line 6—6 in Fig. 4, and Fig. 7 shows the flywheel of Figs. 1 to 6 associated with a stator.

Referring to the drawings, the rim portion of the flywheel is in the form of a casting 10 in aluminum or zinc alloy, or other suitable non-magnetic material, in which are set eight permanent magnets 11 and laminated pole pieces 12 and 13, the magnets and pole pieces being cast in position. The magnets 11 are so arranged that, as shown in Fig. 6 the pole pieces 12 are of north polarity and the intervening pole pieces 13 are of south polarity. Thus, the pole pieces of each adjacent pair of pole pieces around the flywheel rim will be oppositely polarized by means of the permanent magnets 11. As shown best in Fig. 1 four uniformly-spaced recesses 14 are formed in the casting 10 where the pole pieces 12 are exposed.

A steel plate 15 formed to the shape shown best in Figs. 4 and 5 has a flanged steel hub 16 spot welded thereto (for instance at eight equally spaced points) and has four projecting arms 17. It will be seen that the arms 17 are dished in such a manner that they are spaced or displaced from the nearer of two parallel boundary planes of the rim portion excepting at their junction with the rim portion. In this way flux leakage to the stator can be largely avoided. The extremities of the arms 17 are set in the recesses 14 and are secured by rivets 18 only to the pole pieces 12 having like polarity. It is because the arms 17 are all of the same polarity that the member 17, 18 can be made of a magnetic material, namely steel, with the advantage that the thickness of the structure can be reduced for a given strength. The construction is also less expensive than known structures of the same kind.

The number of arms 17 may be other than four. Preferably, however, the number is at least three. The number of magnets 11 will be twice the number of the arms in order to achieve the desired polarities.

As shown in Fig. 7 the flywheel rotor is mounted on a shaft 19 so as to be rotatable relatively to a stator 20 mounted upon a fixed support 21 and having laminated pole pieces 22 provided with windings 23. The pole pieces 12 and 13 have exposed inwardly directed surfaces arranged to cooperate with or pass in closely spaced relationship the outwardly directed surfaces of the pole pieces 22 of the stator 20, which is encircled by the flywheel.

The alternator according to the invention is well-suited for use as a magneto in an ignition system.

I claim:

1. A permanent magnet alternator comprising a flywheel having a rim portion, a hub portion, a plurality of steel arms connecting said rim portion to said hub portion, and a plurality of permanent magnets equal to twice the number of said arms carried by said rim portion and positioned to polarize the outer extremities of all said arms to the same polarity.

2. A permanent magnet alternator comprising a flywheel having a rim portion, a hub portion, a plurality of steel arms connecting said rim portion to said hub portion, a plurality of uniformly-spaced permanent magnets equal to twice the number of said arms carried within said rim portion, and a plurality of laminated pole pieces extending between said magnets, said magnets being positioned to polarize the outer extremities of all said arms to the same polarity.

3. A permanent magnet alternator according to claim 2, wherein said pole pieces have exposed inwardly-directed surfaces to cooperate with outwardly directed surfaces of stator pole pieces.

4. A permanent magnet alternator according to claim 2, wherein said rim portion is bounded by two parallel planes and wherein the said arms are dished in such a manner that the central parts thereof are displaced from the said planes excepting near the rim portion.

5. A permanent magnet alternator comprising a flywheel having a rim portion, a magnetic hub portion and a plurality of magnetic arms connecting said rim portion to said hub portion, said rim portion comprising a plurality of pole pieces spaced around the rim and permanent magnet means for oppositely polarizing the pole pieces of each adjacent pair of pole pieces, said arms being connected to said rim portion only adjacent pole pieces of like polarity.

References Cited in the file of this patent

UNITED STATES PATENTS

| | | |
|---|---|---|
| 1,274,115 | Warren | July 30, 1918 |
| 2,060,259 | Spengler | Nov. 10, 1936 |